Figure 1:
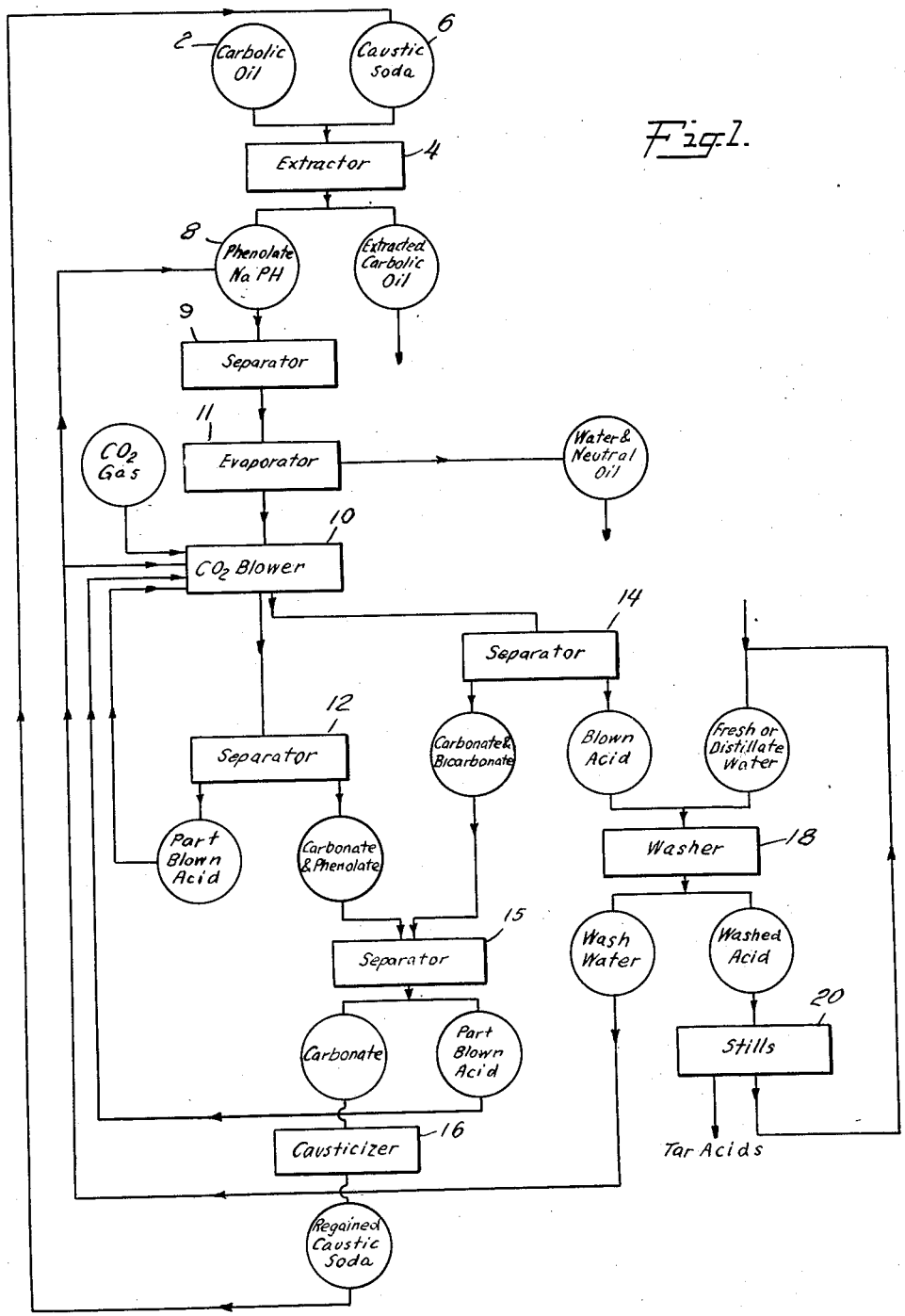

Jan. 23, 1934.  W. C. COOPER, JR  1,944,681
PRODUCTION OF TAR ACIDS
Filed Jan. 7, 1931  2 Sheets-Sheet 1

INVENTOR
William C. Cooper., Jr
BY
ATTORNEY

Patented Jan. 23, 1934

1,944,681

UNITED STATES PATENT OFFICE 1,944,681

PRODUCTION OF TAR ACIDS

William C. Cooper, Jr., Venice, Calif., assignor to The Barrett Company, New York, N. Y., a corporation of New Jersey Application January 7, 1931. Serial No. 507,291

11 Claims. (Cl. 260—154)

My invention relates to the production of tar acids and to the treatment of crude tar acids liberated from phenolate solutions by acidification thereof.

In the production of tar acids such as phenols, cresols and the like, it is usual practice to treat oil containing the same with an alkali to form a water solution of alkali phenolates and after separating the phenolate solution from the extracted oil, to dilute the solution and steam distill the same to remove further amounts of extracted oil. The phenolate solution is then concentrated and acidified with sulfuric acid or carbon dioxide to liberate the tar acids. When carbon dioxide is employed for liberating the tar acids, the resulting tar acids contain substantial amounts of alkali carbonates and bicarbonates as impurities as well as phenolates that have been dissolved in the tar acids. Heretofore, these carbonate and phenolate impurities have been removed from the tar acids by treatment with sulfuric acid. The phenolates present in the crude tar acids are thus converted to tar acids, increasing the yield thereof, and the carbonate impurities are converted to sulfates. The solution of alkali sulfates thus produced is then separated from the tar acids and discarded.

This practice results in substantial losses of tar acids probably in part by reason of the sulfonation of the tar acids during the treatment with sulfuric acid to liberate additional tar acids and remove the carbonate impurities. Additional quantities of tar acids are dissolved in the solution of alkali sulfates produced and are lost in separating and discarding the sulfate solution. Furthermore, the tar acids produced in the manner described above are inferior in quality particularly with reference to the color and odor of the product as compared with tar acids produced when sulfuric acid is not employed in the treatment. The prior processes also result in substantial losses in caustic soda or other alkali employed in forming the alkali phenolates since the alkali is converted to the sulfate and cannot be recovered profitably therefrom. Moreover, large and costly apparatus is required in such processes for carrying out the acidification and related operations.

In accordance with my invention, the process for obtaining tar acids is materially simplified, the use of sulfuric acid may be eliminated and the tar acids produced are superior in quality to those resulting from the treatment of tar acids by methods heretofore employed. These advantages are obtained by effecting the removal of water-soluble impurities such as the carbonates produced in the acidification of the phenolate solution by washing the resulting crude tar acids with water. The dissolved phenolates extracted in this way from the tar acids are returned to the system so that no tar acids are lost in the process.

In a preferred embodiment of my invention, the phenolate solution is acidified with sufficient carbon dioxide to liberate the tar acids and convert the alkali to the normal carbonate without forming substantial amounts of the bicarbonate. The crude tar acids thus produced are separated from the carbonate solution and if desired may be subjected to further treatment with carbon dioxide and again separated from the carbonate solution formed. The separated tar acids are then subjected to repeated washings with water to remove the soluble carbonates and dissolved phenolates present as impurities in the tar acids. The wash water employed in carrying out the successive washing operations will contain tar acids both as free acids and as phenolates and therefore I prefer to utilize the wash water from the last washing operation on one batch of tar acids in the first washing operation given to a succeeding batch of tar acids and to return the water from the first washing operation to the phenolate solution being acidified with $CO_2$ or at some other suitable stage of the process so that none of the tar acids are lost in effecting the purification thereof.

Among the objects of my invention are to effect the recovery and purification of tar acids, to provide a process which is simple and inexpensive to employ and by means of which the losses resulting from the purification of the crude tar acids are reduced and to obtain a product that is of improved quality.

Further objects of my invention are to effect a saving in the amount of carbon dioxide and alkali employed in the process, to provide a cyclic process in which the alkali employed may be utilized repeatedly in the treatment of successive batches of oil containing the tar acids and to eliminate the use of expensive apparatus heretofore employed for carrying out the acidification of the crude tar acids to remove carbonate impurities therefrom. These and other objects and features of my invention will appear from the following description of preferred embodiments thereof in which reference is made to the accompanying figures of the drawings, in which Fig. 1 is a flow sheet illustrating one process embodying my invention, and Fig. 2 is a flow sheet illustrating a modified process embodying my invention.

Figure 2:
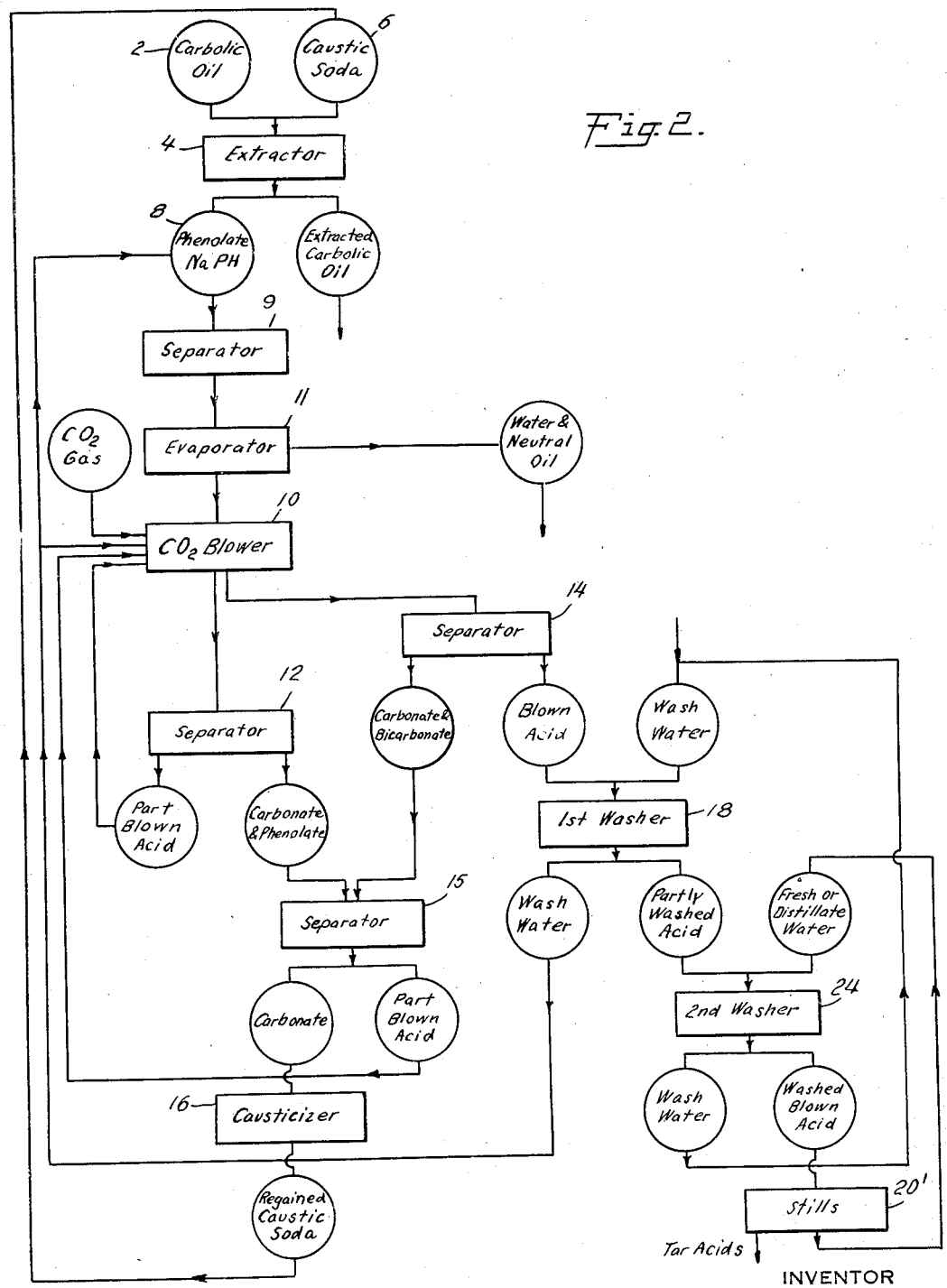

In carrying out the process as illustrated in the flow sheet of Fig. 1, the oil containing tar acids, which may be crude carbolic oil or other coal tar distillate containing tar acids, is passed from a reservoir, tank car or other source 2 to an extractor 4 wherein the tar acids are treated with an alkali solution such as caustic soda or other suitable alkaline agent such as sodium sulfide from the reservoir 6 and are thereby converted into alkali phenolates which are water soluble and form a solution that is separated from the extracted carbolic oil. The extracted carbolic oil is withdrawn and the solution of alkali phenolates is passed to chamber 8. The phenolate solution may be diluted to separate dissolved neutral oil preferably by the addition of wash water separated from previously treated tar acids as will appear hereafter. The diluted tar acids are then passed to the separator 9 and evaporator 11 to concentrate the tar acids and to remove further neutral oil by steam distillation. The resulting phenolate solution is then treated with carbon dioxide in the $CO_2$ blower 10 to liberate the tar acids as crude free acids and convert the alkali into alkali carbonates.

In the preferred manner of conducting my process the acidification with $CO_2$ is carried to that point where further acidification would result in the formation of bicarbonate so that substantially all of the alkali liberated is in the form of the normal carbonate rather than bicarbonate. I then separate the carbonate solution produced in the separator 12 and ordinarily acidify the partially blown tar acids containing dissolved phenolates a second time to liberate dissolved phenolate as tar acids. In this second treatment, when $CO_2$ is employed, I prefer to continue the operation until the carbonate formed has been largely converted to the bicarbonate. By thus separating the carbonate solution produced before again acidifying the tar acids, I avoid a waste of $CO_2$ in converting large amounts of carbonate to the bicarbonate.

After the crude tar acids have been treated with carbon dioxide a second time, they are passed from the $CO_2$ blower 10 to a second separator 14 where the blown acid which may still contain small amounts of dissolved phenolates and other soluble alkali compounds, is separated from the remaining bicarbonate solution. The carbonate solutions from the separators 12 and 14 are passed to a separator 15 where the bicarbonate solution from separator 14 is mixed with the carbonate solution from the separator 12 and reacts with the phenolates contained in the solution from separator 12 to liberate tar acids therefrom and convert the bicarbonate to the normal carbonate which can be causticized more economically than the bicarbonate. The tar acids liberated are separated and returned to the $CO_2$ blower and the carbonate solution containing little or no bicarbonate and but a small amount of phenolate is passed to a causticizer 16 where the carbonate is converted to caustic alkali which is returned to the reservoir 6 for use in treating further quantities of carbolic oil in the extractor 4. The phenolates separated from the tar acids with the carbonate solutions in the separators 12 and 14 are thereby returned to the cycle.

The resulting carbon-dioxide-blown crude tar acids thus obtained contain carbonate impurities and in order to remove these impurities, the crude tar acids are passed to a washer 18 where they are washed with water. The wash water separated from the tar acids after this washing operation contains not only the carbonate impurities removed from the crude tar acids but also contains tar acids in solution and may contain some remaining unconverted phenolates removed from the blown tar acids and other water-soluble organic and inorganic impurities. The wash water is therefore returned to the carbon dioxide blower 10 where the tar acids and unconverted phenolates contained in the wash water are added to a succeeding batch of tar acids preferably during the second carbon dioxide treatment, or, as illustrated in Fig. 1, the wash water may be added to the phenolate solution in the chamber 8 to dilute the phenolate solution and aid in the separation of neutral oil therefrom or may be added to the caustic soda solution used in treating the oil to convert tar acids therein to alkali phenolates. In this way, tar acids which would normally be lost in the operation, are returned to the cycle and recovered in the treatment of succeeding batches of crude tar acids.

In the invention as illustrated in the flow sheet of Fig. 1, the washed tar acids from the washer 18 are passed directly to the stills 20 where they are distilled to obtain purified tar acids substantially free from water. In practice, a sharp separation between water and tar acid fractions is not obtained and the first fraction of distillate consists of water containing a substantial proportion of tar acids. The water fraction removed during the distillation operation if desired can be returned to the washer 18 and employed in the washing of subsequent batches of crude tar acids so that none of the tar acid is lost in carrying out the process. If preferred, however, fresh water may be used in the washing operation or both the water removed from the tar acids in the stills and fresh water may be used in the washing operation.

In the embodiment of my invention shown in Fig. 2, the crude tar acids are obtained by the treatment with a suitable alkali of oil containing tar acids, and the acidification of the resulting phenolate solution with $CO_2$ is carried out as in the form of the invention described above. The crude tar acids containing carbonate impurities are washed as before in the washer 18 and the partially washed tar acids are separated from the wash water. The wash water from the first washing operation is returned to the carbon dioxide blower 10 or to the chamber 8 for diluting the phenolate solution, and the washed crude tar acids are passed to a second washer 24. The crude tar acids are thus subjected to a second water washing operation to remove further amounts of the carbonate impurities present in the tar acids. After the second washing operation, the tar acids are again separated from the wash water and the wash water from the second treatment returned to the washer 18 for use in the first washing operation employed in the treatment of further quantities of crude tar acids. The tar acids from the washer 24 pass to the stills 20' where they are subjected to distillation to obtain the purified tar acids. As in the previously described form of my invention, the water removed from the tar acids during distillation may be returned to the washer 24 for use in the second washing operation given to succeeding batches of the tar acids or if desired fresh water may be used in the second washing operation or both fresh and distillate water may be used.

In a typical example of my process as embodied in the invention illustrated in the flow sheet of Fig. 2, crude carbolic oil having a boiling point range of from about 100° C. to about 345° C. and containing approximately 7 to 8 percent by volume of tar acids is treated with a solution of caustic soda in the usual manner to convert the tar acids in the carbolic oil to sodium phenolates. The water solution of sodium phenolates is separated from the extracted carbolic oil and after dilution and evaporation to remove further amounts of the extracted oil, the phenolate solution is passed to a $CO_2$ blower where it is acidified by carbon dioxide thus liberating the crude tar acids. The tar acids and resulting carbonate solution are then separated and the tar acids again treated with $CO_2$ to liberate further amounts of tar acids from the phenolates dissolved in the separated tar acids. After the second $CO_2$ treatment, the blown tar acids are separated from the carbonate solution and subjected to the washing operations.

In one instance, 13,920 gallons of crude tar acids produced in this manner, having an alkalinity calculated as NaOH (due to the presence of carbonate and phenolate impurities) amounting to .92% where the term percent refers to grams of NaOH per 100 cc. of tar acids, and containing 22.5% by volume of water, were treated in accordance with the process as shown in the flow sheet of Fig. 2. In accordance therewith, the tar acids were washed with 6,246 gallons of wash water obtained from the second washing operation of a previously treated batch of tar acids. The wash water employed when added to the tar acids had an alkalinity of 0.15% expressed in grams of NaOH per 100 cc. of wash water and contained 6.47% by volume of tar acids. The wash water was pumped into the bottom of a tank containing the carbon-dioxide-blown crude tar acids and being lighter than the tar acids passed upwardly through the acid. Recirculation of wash water through the acids was then started to effect thorough agitation of the wash water and crude tar acids. During the circulation, steam was injected into the stream of tar acids passing upwardly adjacent the outside of the tank thus heating the tar acids and aiding in the washing of the same due to the intimate contact between the acid and the steam during circulation. After four hours of circulation, the wash water was saturated and would effect no further extraction of the carbonate impurities from the tar acids being treated. Samples of the tar acids taken during the first washing operation in the example cited indicated the following reduction in alkalinity and changes in temperature:

|  | Total alkalinity | Temp. |
| --- | --- | --- |
|  | Percent | °C. |
| Start | 0.92 | 31 |
| 1 hour | 0.61 | 33 |
| 2 hours | 0.61 | 35 |
| 3 hours | 0.53 | 40 |
| 4 hours | 0.53 | 44 |

The wash water and tar acids were then withdrawn from the agitator and allowed to settle for two hours. The wash water was then drawn off from the top of the settling tank. 7,008 gallons of wash water were thus separated after the first washing operation, the increase in volume of the wash water being due to condensation of the steam introduced during circulation. The wash water had a total alkalinity of 1.18% and contained 7.64% by volume of tar acids. This wash water was returned to the carbon dioxide blower and added to the tar acids and phenolate undergoing the second treatment with $CO_2$.

In the second washing operation, 5,568 gallons of fresh water were employed and the partially washed tar acids again agitated with water for about four hours. The following table indicates the reduction in alkalinity and the temperature of the tar acids during treatment:

|  | Total alkalinity | Temp. |
| --- | --- | --- |
|  | Percent | °C. |
| Start | 0.53 | 35 |
| 1 hour | 0.38 | 40 |
| 2 hours | 0.38 | 44 |
| 3 hours | 0.30 | 48 |
| 4 hours | 0.30 | 50 |

After the second washing operation had been completed, the tar acids and wash water were allowed to settle for six hours and the tar acids and wash water separated. 6,528 gallons of wash water were obtained from the second washing and were found to have a total alkalinity of .57% and contained 8.16% by volume of tar acids. This wash water from the second washing operation was then returned to the first washer and used in the treatment of a succeeding batch of the crude tar acids. In the example cited, 13,536 gallons of washed tar acids were obtained having a total alkalinity of 0.30% and containing 21.2% of water. This recovery represents 97.2% of the crude tar acids washed. The tar acids thus purified were sent to the stills wherein they were subjected to distillation to effect further purification of the product.

While I have given specific data illustrating the process shown in the flow sheet of Fig. 2, it will be apparent that the washed tar acids from the first treatment may be passed directly to the stills without employing the second washing operation. In general, I prefer to employ in each washing operation, an amount of wash water equal to about one-third of the amount of tar acids undergoing treatment. I also prefer to continue the washing operation in either one or two stages as described above until the total alkalinity of the washed tar acids is reduced to about 0.32% or less expressed in grams of NaOH per 100 cc. of tar acids.

From the foregoing description of my invention, it will be apparent that I do not employ sulfuric acid in any stage of the operation and that the alkali used for separating the tar acids from the oil in which they occur is obtained in a form from which it may be readily recovered and causticized for reuse. Furthermore, none of the tar acids are lost in the operation since the wash water from each treatment is returned to the process and any tar acids contained in the wash water are thus recovered.

I have found that the product produced in carrying out my process has less corrosive action on the stills employed for distillation of the tar acids and that less residue is left in the stills after distillation than when the tar acids are treated with sulfuric acid to remove carbonate impurities therefrom. It is also a striking fact that the amount of water contained in the washed tar acids is less than that contained in the tar acids prior to their treatment to remove the carbonate impurities. The product obtained by my process as described above is improved in quality in that it contains no sodium sulfate and the color and odor of the product are superior to that of tar acids obtained by the prior process wherein sulfuric acid is employed for removing the carbonate impurities. Moreover, my process can be carried out without the use of the expensive apparatus heretofore used in the treatment of the tar acids with sulfuric acid.

The term "phenolates" as used throughout the specification and claims is intended to include all of the products of the reaction between the tar acids and the alkali used for separating the tar acids from the oils in which they occur and is not limited to the alkali salt of carbolic acid. I also wish it to be understood that the foregoing examples of my process are given by way of illustration and are not intended as limiting the scope of the invention.

I claim:

1. The process of obtaining tar acids from coal tar distillates, which comprises the following steps: (1) treating the distillates with alkali to convert the tar acids to alkali phenolates; (2) separating the alkali phenolates from the oil; (3) acidifying the phenolates with carbon dioxide to liberate the tar acids; (4) washing the tar acids with water to remove phenolates, carbonates, and other water-soluble impurities retained by the tar acids; (5) separating the wash water from the washed tar acids; and (6) introducing the wash water in a step following step (1) of the process.

2. The process of obtaining tar acids from coal tar distillates, which comprises the following steps: (1) treating the distillates with alkali to convert the tar acids to alkali phenolates; (2) separating the alkali phenolates from the oil; (3) acidifying the phenolates with carbon dioxide to liberate the tar acids; (4) washing the tar acids with water to remove phenolates, carbonates, and other water-soluble impurities retained by the tar acids; (5) separating the wash water from the washed tar acids; and (6) introducing the wash water from step (5) into step (3).

3. In the treatment of a phenolate solution to obtain tar acids therefrom, the steps of (1) acidifying the phenolate solution with sufficient carbon dioxide to liberate the tar acids and convert the alkali principally to the normal carbonate but insufficient to form substantial amounts of bicarbonate; (2) separating the carbonate solution from the tar acids thus liberated; (3) treating the tar acids containing dissolved phenolates with carbon dioxide until the further alkali liberated is converted to the bicarbonate; (4) separating the tar acids from the bicarbonate solution; and (5) mixing the carbonate solution from step (2) with the bicarbonate solution from step (4) to convert the bicarbonate to the normal carbonate and liberate tar acids contained in said carbonate and bicarbonate solutions.

4. The process of obtaining tar acids from coal tar distillates, which comprises (1) treating the distillates with caustic solution to convert the tar acids to alkali phenolates; (2) separating the alkali phenolates from the oil; (3) acidifying the phenolates with sufficient carbon dioxide to liberate the tar acids and convert the alkali principally to the normal carbonate but insufficient to form substantial amounts of bicarbonate; (4) separating the carbonate solution from the tar acids thus liberated; (5) treating the tar acids containing dissolved phenolates with the carbon dioxide until the further alkali liberated is converted to the bicarbonate; (6) separating the tar acids from the bicarbonate solutions; and (7) mixing the carbonate solution from step (4) with the bicarbonate solution from step (6) to convert the bicarbonate to the normal carbonate and liberate the tar acids contained in said carbonate and bicarbonate solutions.

5. The process of obtaining tar acids from coal tar distillates, which comprises the following steps: treating the distillates with alkali to convert the tar acids to alkali phenolates, acidifying the phenolates to liberate the tar acids, washing the tar acids with water to remove phenolates and other water-soluble impurities retained by the tar acids, separating the wash water from the tar acids, and introducing the wash water into any of the steps preceding the separation of the wash water from the tar acids and following the treatment of the distillates with alkali.

6. The process of obtaining tar acids from coal tar distillates, which comprises treating the distillates with alkali to convert the tar acids to alkali phenolates, acidifying the phenolates with carbon dioxide, separating the liberated tar acids from the carbonate solution produced, washing the liberated tar acids with water, separating the wash water from the tar acids, subjecting the tar acids to a second washing operation with water, and separating the wash water from the second washing operation from the tar acids, utilizing the wash water from the second washing operation in the first washing operation of a succeeding quantity of tar acids and adding the wash water from the first washing operation to the phenolates being acidified with carbon dioxide.

7. The process of obtaining tar acids from coal tar distillates containing tar acids which comprises treating the distillates with alkali to convert the tar acids to alkali phenolates, acidifying the phenolates with carbon dioxide to liberate the tar acids, washing the tar acids thus obtained with water to remove water soluble carbonates and phenolates, separating the water extract from the extracted tar acids, treating the water extract with carbon dioxide to decompose the phenolates and liberate tar acids, and separating the liberated tar acids from the water.

8. The process of recovering tar acids from phenolates dissolved in tar acids which comprises extracting with water the tar acids containing water soluble carbonates and phenolates, separating the water extract from the tar acids, treating the water extract with carbon dioxide to decompose the phenolates and set free tar acids, and separating the freed tar acids from the water.

9. The process of obtaining tar acids from coal tar distillates containing tar acids, which comprises treating the distillates with alkali to convert the tar acids to alkali phenolates, acidifying the phenolates with carbon dioxide to liberate the tar acids, washing the tar acids thus obtained with water to remove water-soluble carbonates and phenolates, separating the water extract from the extracted tar acids, decomposing the phenolates in the water extract to liberate tar acids, and separating the liberated tar acids from the water extract.

10. In the treatment of phenolate solutions to obtain tar acids therefrom, the steps of acidifying the phenolate solution with sufficient carbon dioxide to liberate the tar acids and convert the alkali principally to the normal carbonate but insufficient to form substantial amounts of bicarbonate, separating the carbonate solution from the tar acids thus liberated, treating the tar acids containing dissolved phenolates with carbon dioxide until the further alkali liberated is converted to the bicarbonate, separating the tar acids again from the carbonate solution and washing the tar acids with water.

11. In the treatment of phenolate solutions to obtain tar acids therefrom, the steps of acidifying the phenolate solution with sufficient carbon dioxide to liberate the tar acids and convert the alkali principally to the normal carbonate, but insufficient to form substantial amounts of the bicarbonate, separating the carbonate solution from the tar acids thus liberated, again treating the tar acids containing dissolved phenolates with carbon dioxide, separating the tar acids again from the carbonate solution and washing the tar acids with water.

WILLIAM C. COOPER Jr.